United States Patent [19]

Schluntz et al.

[11] 4,281,555

[45] Aug. 4, 1981

[54] MOLDED INERTIAL SENSOR

[75] Inventors: Roy A. Schluntz, Melrose; John R. Stemniski, Swampscott, both of Mass.

[73] Assignee: The Charles Stark Draper Laboratory, Inc., Cambridge, Mass.

[21] Appl. No.: 932,139

[22] Filed: Aug. 8, 1978

[51] Int. Cl.³ .................. G01C 19/02; G01C 19/30; G01C 19/06
[52] U.S. Cl. .................... 74/5 R; 74/5.47; 74/5.6 D; 74/5.7
[58] Field of Search .............. 74/5 R, 5.7, 5.6 D, 74/5.47; 29/598

[56] References Cited

U.S. PATENT DOCUMENTS

| | | | |
|---|---|---|---|
| 2,547,968 | 4/1951 | Paulus | 74/5.7 X |
| 2,752,791 | 7/1956 | Jarosh et al. | 74/5.6 D |
| 2,937,533 | 5/1960 | Barkalow | 74/5.6 D |
| 2,982,139 | 5/1961 | Bennett | 74/5.6 D |
| 3,043,147 | 7/1962 | Will, Jr. | 74/5 |
| 3,313,162 | 4/1967 | Bundschuh | 74/5 X |
| 3,318,160 | 5/1967 | Erdley et al. | 74/5 X |
| 3,339,421 | 9/1967 | Warnock, Jr. | 74/5 |
| 3,466,934 | 9/1969 | Pinard | 74/5 |
| 3,678,765 | 7/1972 | Feldman | 74/5 X |
| 3,722,295 | 3/1973 | Passarelli, Jr. | 74/5.7 X |
| 3,727,466 | 4/1973 | Kraus et al. | 74/5.7 |
| 3,802,068 | 4/1974 | Scott | 29/598 |
| 3,831,268 | 8/1974 | Boyd et al. | 29/598 |
| 3,840,983 | 10/1974 | Ryff | 29/598 |
| 3,886,803 | 6/1975 | Jacobson et al. | 74/5.6 D |
| 3,954,932 | 5/1976 | Coale | 264/122 |
| 4,028,962 | 6/1977 | Nelson | 74/572 |
| 4,043,205 | 8/1977 | Merlo | 74/5.7 X |
| 4,061,043 | 12/1977 | Stiles | 74/5 R |
| 4,075,388 | 2/1978 | Doss | 428/297 |
| 4,114,452 | 9/1978 | Bitson | 74/5 R |

Primary Examiner—Leslie Braun
Attorney, Agent, or Firm—Kenway & Jenney

[57] ABSTRACT

Structural elements of an inertial sensor are fabricated from molded plastic materials. The structural elements are characterized by relatively, small cross-section areas, and further incorporate keys and keyways, as well as guide and alignment slots, molded into the elements for coupling various structural elements.

9 Claims, 7 Drawing Figures

4,281,555

MOLDED INERTIAL SENSOR

BACKGROUND OF THE INVENTION

The invention relates to inertial sensors, and more particularly to inexpensive gyroscopes fabricated from molded components.

The design features of conventional inertial sensors, such as gyroscopes, for commercial and military applications utilize structural support elements machined from materials, such as aluminum, beryllium, and stainless steel. Generally, these support elements are manufactured using standard machining processes.

The gyro sub-component structures often depend in shape and size upon machining requirements. Typically, a component, such as a gimbal must initially be rough machined and then heat treated. Final machining operations may then be performed, including the machining of slots, holes, and grooves. The part is then stress-relieved. Expensive fixturing is then required for gyro assembly operations, such as alignment of the signal and torque generator rotors, motor stator and wheel. Subsequently, encapsulation operations are typically required. All these assembly operations are usually performed by hand and are quite time consuming and correspondingly expensive.

Instrument production analyses of commercial and military inertial sensors using conventional design features indicate that approximately 75% of the total unit production costs can be related directly to support element materials and fabrication and assembly operations.

Furthermore, instruments manufactured by the prior art methods are subject to substantial lot-to-lot and unit-to-unit variations, for example, due to machining tolerances or contamination resulting from part handling. In addition, many critical assembly operations are operator-sensitive, and are difficult to monitor. To overcome some of these effects, sensor fabrication operations are often performed in an expensive clean room facility.

Accordingly, it is an object of the invention to provide inertial sensors produced by precision, high volume production fabrication techniques.

It is another object of the invention to provide inertial sensors constructed of inexpensive materials.

It is still another object of the invention to create components for gyroscopes that require simplified design with very few piece parts.

It is a further object of the invention to provide inertial sensors characterized by minimal in-process assembly operations and tooling.

SUMMARY OF THE INVENTION

An inertial sensor has its major structural elements fabricated from molded plastic materials. The molded elements are characterized by relatively small cross-sectional areas. Further, the molded structural elements incorporate keys, and keyways, as well as guides and alignment slots, molded into the elements. In a preferred embodiment, the plastic material is 30% graphite-filled polyphenylene sulfide. The elements are molded in a way that retains the random orientation of the fibers and minimizes gaps and voids in the plastic material. The use of molded inertial instrument components permits simplified design with fewer piece parts compared to the prior art, and substantially reduced requirements for in-process assembly operations and tooling. In addition, the preferred thermoplastic materials are as much as fifty times less expensive than materials (such as beryllium) used in the prior art.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
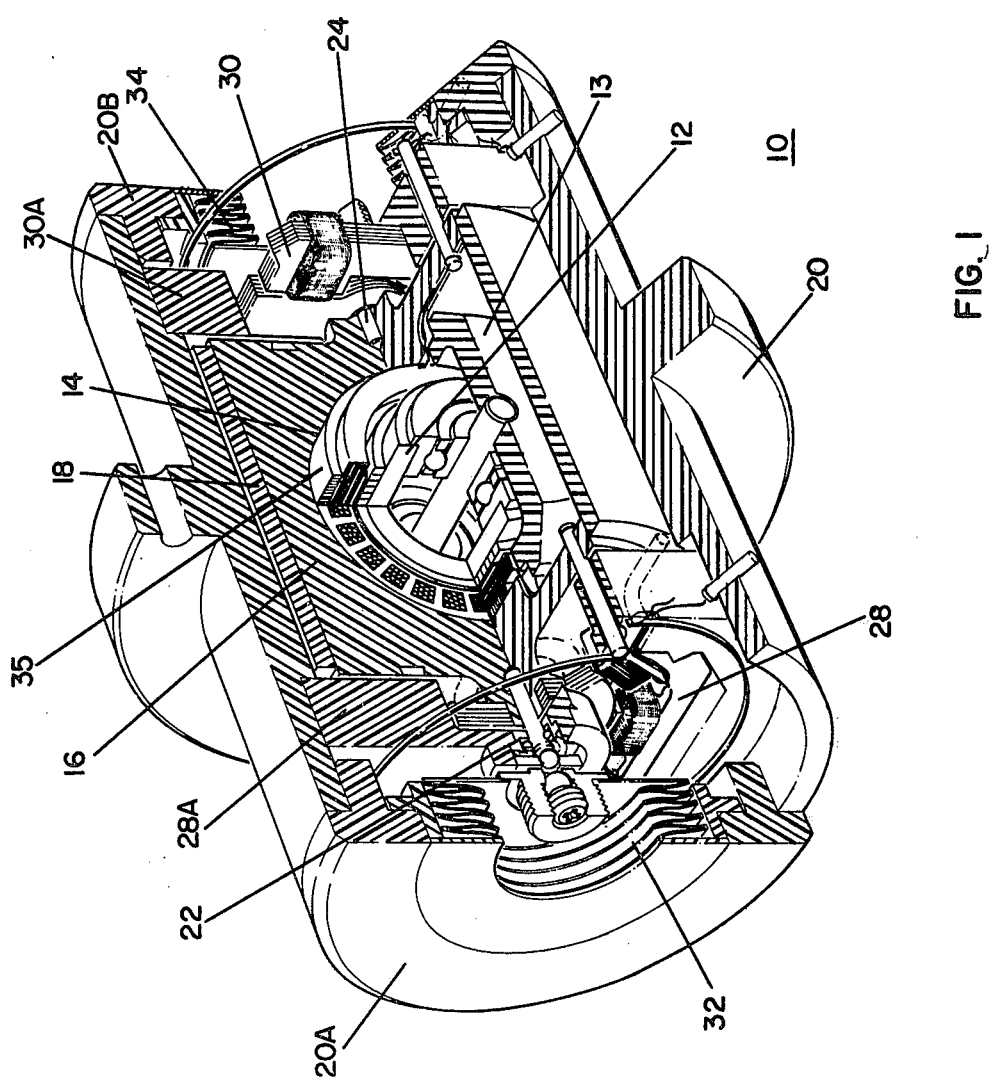
FIG. 1 is a perspective view of an inertial sensor embodying the invention, partially cut away.

FIGS. 1, 2B, 3 and 4 show an exemplary inertial instrument in accordance with the present invention. Instrument 10 is a single-degree-of-freedom integrating rate gyro based on well-established operating principles. The gyro includes a ball bearing wheel assembly 12, wheel support 13, a synchronous hysteresis motor 14, all positioned within a float gimbal 16. The gimbal 16 includes a wheel housing portion 17a and end portions 17b and 17c. End portions 17b and 17c are adapted to frictionally engage the interior wall of a cylindrical sleeve 18 which encases the gimbal float assembly within a main housing assembly 20 having end caps 20A and 20B. The gimbal 16 and sleeve 18 are supported at each end by radial support bearings 22 and 24.

In the embodiment of FIG. 1, the signal generator 28 and torque generator 30 have rotor and stator elements which are chemically etched and bonded, laminated core members. The stator for the wheel motor is also chemically etched and bonded, laminated core members.

A microsyn signal generator 28 is positioned at one end of the gyro 10 on support member 28A and a clapper type torque generator 30 is positioned at the other end on support member 30A. Bellows assemblies 32 and 34 are positioned at the ends of the gyro 10 to accommodate thermally-induced volumetric changes in the float fluid within housing 20. The ball bearing wheel assembly 12 incorporates conventional ball bearings in this embodiment, although alternative bearings might be used in other embodiments.

The motor 14 includes machine wound coils mounted on a chemically etched and bonded laminated motor stator 35. The wheel/motor assembly uses large air gaps between the rotor (in the wheel assembly) and the stator 35. In this configuration, the wheel rotates at 24,000 revolutions per minute, generating an angular momentum of 10,000 dyn-cm-s, with a total running power of approximately 2.5 watts.

Figure 2B:
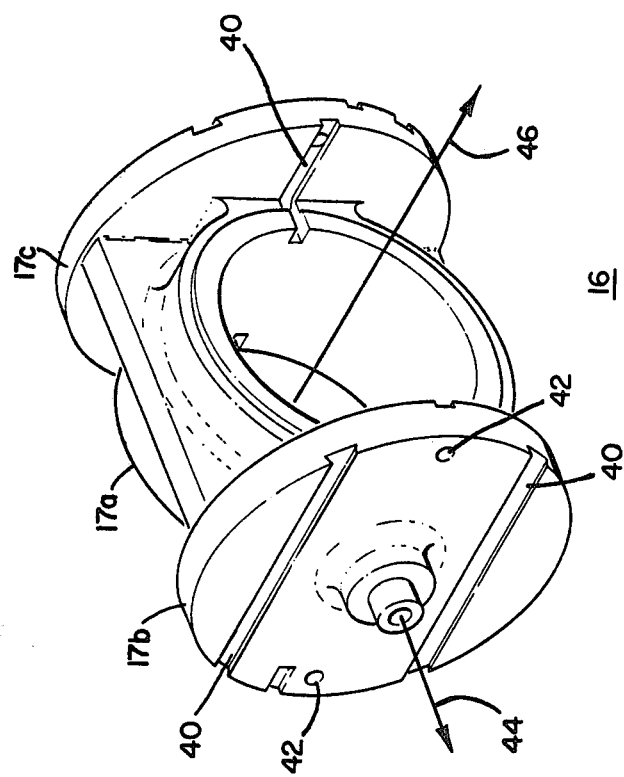
FIGS. 2A and 2B show perspective views of a prior art gimbal and the gimbal of the sensor of FIG. 1, respectively.
Figure 2A:
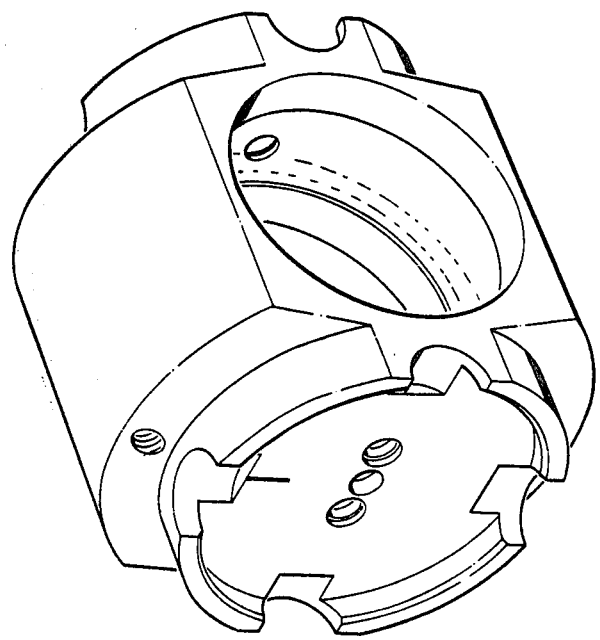

The float gimbal 16 is shown in FIG. 2B, with a comparable float gimbal from the prior art shown in FIG. 2A. The gimbal 16 of the present invention (FIG. 2B) is adapted for easy assembly with the molded sleeve 18 and wheel support bearings for the radial support bearings 22 and 24. The gimbal 16 includes dovetail balance weight slots 40 and wire routing slots 42 molded into the end portions 17b and 17c of the assembly. The float 16 is substantially symmetrical about the output axis 44 and spin axis 46, so that the float inertias, differences of inertias and products of inertias are relatively small.

FIG. 2A shows a conventional float gimbal which corresponds to the float gimbal of FIG. 2B in the present embodiment. This conventional float gimbal is typically produced in the prior art from using the method outlined above in the Background of the Invention, including a rough machining stage operation followed by heat treatment, followed by final machining operation and stress relief, and the associated fixturing for assembly and alignment of the SG and TG rotors, motor stator and wheel. In contrast, the molded float gimbal 16 of FIG. 2B requires substantially no machining requirements, and can be produced reliably using high volume production techniques using conventional molding technology. This molded float gimbal 16 is characterized by a minimum of large cross-sectional areas, for example, the wheel housing portion 17a and end portions 17b and 17c are all relatively uniform in cross-sectional areas. Consequently, a minimum of cracking or voids are caused by material shrinkage during the molding process. Furthermore, the float gimbal 16 of FIG. 2B shows holes and slots 40 for balance weights as well as wire troughs 42.

Figure 3:
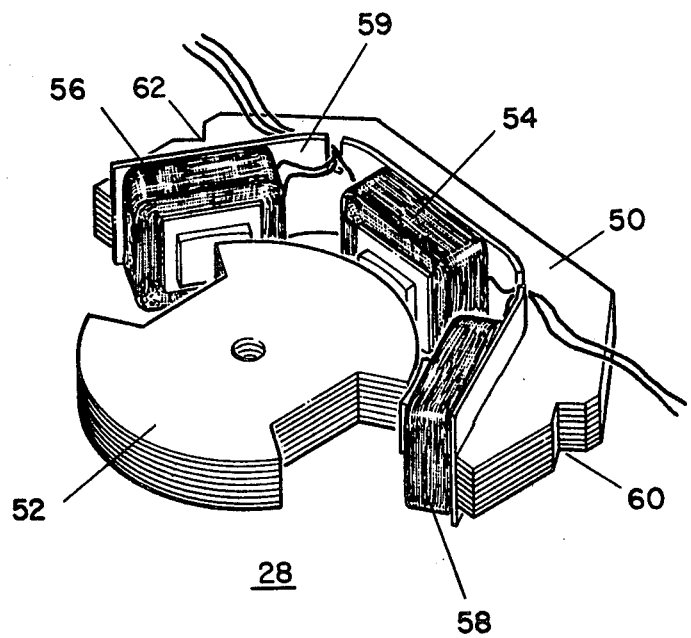
FIG. 3 is a perspective view of the signal generator of the inertial sensor of FIG. 1.

The signal generator 28 is shown in FIG. 3. Generator 28 is a single E-type signal generator (SG) and is adapted to measure angular displacement of the float assembly including gimbal 16 and sleeve 18. The SG 28 includes a chemically etched, bonded laminated core 50 and 52 forming the stator and rotor, respectively. Primary winding 54 and secondary windings 56 and 58 are machine wound coils mounted on a coil support 59 positioned on the assembled laminated stator 50. Assembly notches 60 and 62 are adapted to fix the stator 50 within the housing 20 of gyro 10. The signal generator 28 has the following characteristics:

| Sensitivity | 33 mV/mr |
|---|---|
| Elastic Restraint | 0.0031 dyn-cm/mV |
| Reaction Torque | 0.14 dyn/cm |
| Null Output Voltage | 0.6 mV |
| Power | 33 mW |

Figure 4:
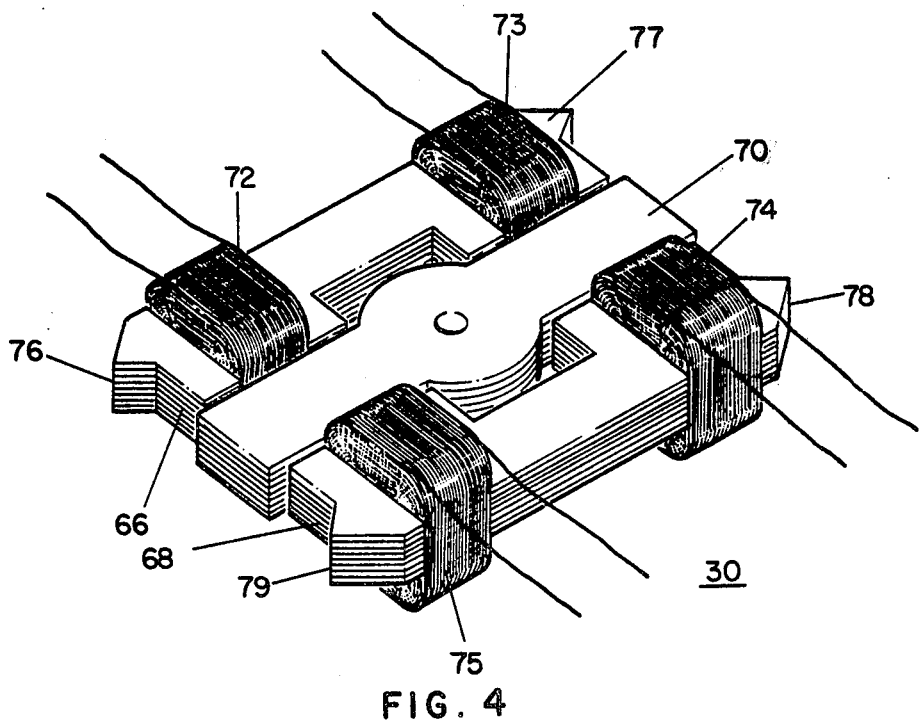
FIG. 4 is a perspective view of the torque generator of the inertial sensor of FIG. 1.

The torque generator 30 is shown in FIG. 4 for the present embodiment. Torque generator (TG) 30 is a clapper type generator having high torquing capability. The generator 40 includes etched and bonded laminated core elements forming the stator assemblies 66 and 68 and rotor assembly 70. The stator assemblies 66 and 68 have machine wound coils at each end thereof. These coils are denoted by reference designations 72-75 in FIG. 4. The stators 66 and 68 have tabs 76-79 at their ends for positioning the stators within the housing assembly 20. With this configuration, the TG 30 provides 10,000 dyn-cm torque at a maximum 640 mW.

Figure 5A:
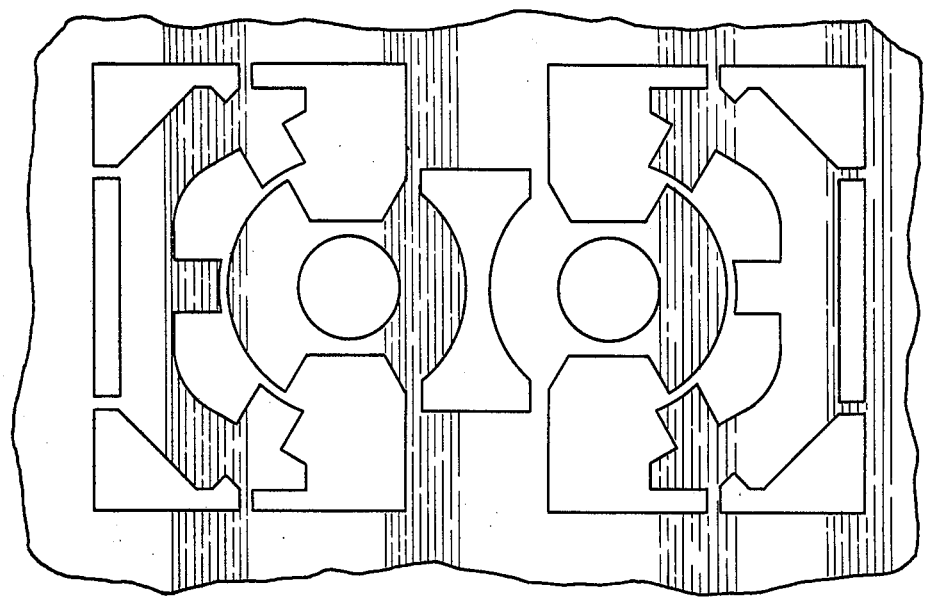
FIGS. 5A and 5B are exemplary lamination frets for the signal generator and torque generator of the inertial sensor of FIG. 1, respectively.
Figure 5B:
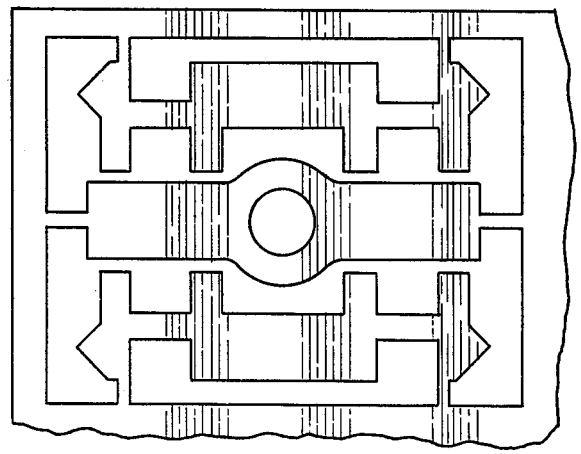

In accordance with the present invention, the laminated core electromagnetic sub-components are chemically etched and bonded to provide substantial cost savings relative to the prior art techniques. In the prior art, laminations are stamped from a based material, annealed, spray coated and stacked in the fixture and bonded, with the resultant handling of the part after forming which is not only time consuming but could lead to damage of the fragile designs. In contrast, the chemically etched parts in accordance with the present invention are annealed prior to the etching step, eliminating a handling step after forming. Using photographic techniques, a master pattern is generated to produce many separate piece parts on one etched frame, or fret. Stacking and bonding, the required number of frets results in aligned, bonded and ready-to-use laminated cores. FIG. 5A shows an exemplary lamination fret for the stator 50 and rotor 52 of signal generator 28 and FIG. 5B shows an exemplary lamination fret for the stators 66 and 68 and rotor 70 of torque generator 30.

The major structural components in gyro 10 are the float assembly, including the gimbal 16, sleeve 18, and wheel support, as well as the main housing assembly 20, including end mounts and outermost end pieces, are molded from thermoplastic. The particular plastic used in the preferred embodiment is commercially available polyphenylene sulfide (Phillips Ryton), with a fiber reinforcement filler. In the preferred embodiment, a 30% carbon fiber reinforcement (CFR) filler is used. In alternative embodiments, either glass fiber or carbon fibers may be used in amounts varying between 10 and 40% for optimum performance. In other embodiments, different ratios may be utilized. Some of the considerations in selection of the filler and amount of filler will now be described.

The principle differences between carbon fiber reinforcement and glass fiber reinforcement are as follows:

(1) The major difference between these two fillers is the electrical and thermal conductivity of the compounds formed. Glass fiber has very high volume resistivity and excellent dielectric properties, while carbon fiber has quite low volume resistivity and lower dielectric properties values. Thermal conductivity is much higher in the more highly filled CFR compounds also. A comparison of mechanical, electrical, and thermal properties of CFR and GFR are set forth in Tables 1 and 2.

(2) Strength values and some creep values favor CFR materials.

(3) Molds tend to wear out more quickly using CFR than they do using glass.

(4) Ryton R4 is 40 percent glass fiber reinforced polyphenylene sulfide (PPS) which is readily available with pre-blending, while CFR PPS at present is supplied with erratic composition.

(5) One high concern area for materials choice in this program is the cost. The CFR material is currently more expensive than glass fiber. In addition, the cost of molding is considerably higher due to shorter mold life.

(6) Static change build-up is worse on glass fiber filled PPS due to the lower electrical conductivity.

TABLE 1

| | 40% CFR | 30% CFR | 10% CFR |
|---|---|---|---|
| Molding Conditions | | | |
| Injection Pressure lb/in.² | 15–20K | 15–20K | — |
| Injection Cylinder Temperature °F. | 575–650 | 575–650 | — |
| Mold Temperature °F. | 100–350 | 100–350 | — |
| Permanence | | | |
| Specific Gravity | 1.62 | 1.42 | 1.38 |
| Mold Shrinkage (in./in.) | | | |
| ⅛ in. Sections | 0.001 | 0.001 | 0.0015 |
| ¼ in. Sections | 0.002 | 0.001 | 0.002 |
| Water Absorption % | | | |

TABLE 1-continued

|  | 40% CFR | 30% CFR | 10% CFR |
|---|---|---|---|
| 24 hours at 23° C. | 0.02 | 0.02 | 0.02 |
| Mechanical |  |  |  |
| Izod |  |  |  |
| Notched ⅛ lb/in.$^2$ | 1.4 | 1.2 | 0.08 |
| Unnotched ⅛ lb/in.$^2$ | 7.0 | 4.0 | 3.0 |
| Tensile lb/in.$^2$ | 20K | 25K | 22K |
| Tensile Elongation % | 1.3 | 0.5 | 0.75 |
| Tensile Modulas |  |  |  |
| lb/in.$^2$ × 10$^6$ | 2 | 3.7 | 2.5 |
| Flexural Strength |  |  |  |
| lb/in.$^2$ | 30K | 31K | 27K |
| Flexural Modulas |  |  |  |
| lb/in.$^2$ × 10$^6$ | 1.6 | 2.5 | 2.1 |
| Compression Strength |  |  |  |
| lb/in.$^2$ | 25K | 26 | 24K |
| Hardness Rockwell R | 123 | 123 | 122 |
| Electrical |  |  |  |
| Dielectric Strength |  |  |  |
| r/min S/T | 350 | — | — |
| Dielectric Constant |  |  |  |
| 1 mc dry | 3.0 | — | — |
| Dissipation force |  |  |  |
| 1 mc dry | 0.001 | — | — |
| Arc Resistance (s) | 120 | — | — |
| Volume Resistivity |  |  |  |
| Ω cm | 10$^{16}$ | 40 | 75 |
| Thermal |  |  |  |
| Deflection temperature (°F.) |  |  |  |
| 264 lb/in.$^2$ | 500 | 500 | 500 |
| 66 lb/in.$^2$ | 500+ | 500+ | 500+ |
| Flammability | SE | SE | SE |
| Coefficient of |  |  |  |
| linear expansion |  |  |  |
| in./in./°F. × 10$^{-5}$ | 1.2 | 0.89 | 1.1 |
| Thermal Conductivity |  |  |  |
| BTU/hr/ft$^2$/°F./in. | 2.2 | 2.5 | 2.1 |

TABLE 2

R4 = 40% glass filled
R6 = Unfilled
XCFR = X% carbon fiber reinforced
T(g) = Glass transition temperature
T(p) = Penetration temperature

| Sample | Exp. Below T(g) in./in./°F. × 10$^{-5}$ | T(g) °C. | T(p) °C. |
|---|---|---|---|
| R6 | 2.65 | 205 | 205 |
| R6 | 1.78 | — | 134 |
| R6 | 3.25 | 73 | 205 |
| LNP | 2.66 | 113 | — |
| 30% | 2.66 | 115 |  |
| CFR PPS | 2.66 | 115 |  |
| LNP |  |  |  |
| 30% CFR | 3.48 | 1.98 |  |
| Polysulfone |  |  |  |
| LNP | 1.79 | 106 |  |
| 30% Glass | 2.91 | 119 |  |
| PPS | 3.41 | 117 |  |
| 10% CFR PPS | — | 67 and 92 |  |
| Fiberite | 3.2 | 78 and 108 |  |
| 30% CFR PPS | — | 95 |  |
| Fiberite | 2.6 | 102 |  |
| Ryton 4 | — |  | 91 |
| Gimbal Part |  | 83 | 120 |
|  |  | 110 |  |

Considerations in the amount of filler versus type of filler are:

(1) In general, 30 percent CFR provides better strength values at the cost of brittleness when the mechanical values are compared to 40 percent glass reinforcement.

(2) Little if any significant advantage is gained by using 10 percent or 20 percent CFR for low cost gyro applications.

In alternative embodiments, the following thermoplastics may be utilized for the molded parts:
Polysulfone—glass and graphite fiber reinforced
Polysulfone (Astrel 360)
Polyimide-amide
Acrylo-Butadiene
Styrene
Nylon (amorphous)

In other embodiments, thermosetting plastics may be used, such as:
epoxy systems from Fiberite
epoxy graphite systems In such embodiments, either glass or carbon fiber reinforcement may be used in the same manner described above in conjunction with the thermoplastic embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A single degree of freedom inertial sensor comprising:
a gimbal assembly including a molded plastic body member having circular end sections at opposite ends thereof, and being adapted for pivotal motion about an output axis and for supporting a wheel member and associated drive means, said wheel member being adapted for rotary motion about a spin axis perpendicular to said output axis, and
further including a molded plastic cylindrical sleeve member adapted to fit over said gimbal member including sections adapted to interfit with said end members to seal the region interior to said sleeve member.

2. An inertial sensor according to claim 1 further comprising:
a housing assembly including a molded plastic, cylindrical outer housing member and a molded plastic end cap member at ends thereof, said end cap members being adapted to interfit with said outer housing member to seal the region interior to said outer housing member.

3. An inertial sensor according to claim 2 further comprising:
molded plastic torque generator (TG) and signal generator (SG) support members adapted to interfit with said housing assembly to define a cylindrical region between said support members within said outer housing member, said support members being further adapted to support a TG and SG respectively within said housing assembly.

4. An inertial sensor according to claim 2 wherein said molded plastic members are formed from a material in the group consisting of thermosetting plastics and thermoplastics.

5. An inertial sensor according to claim 4 wherein said material is polyphenyl sulfide.

6. An inertial sensor according to claim 4 wherein said material is reinforced with glass fibers with substantially random orientation.

7. An inertial sensor according to claim 6 wherein said fiber reinforcement is in the range 10–40%.

8. An inertial sensor according to claim 4 wherein said material is reinforced with carbon fibers with substantially random orientation.

9. An inertial sensor according to claim 8 wherein said fiber reinforcement is in the range 10–40%.

* * * * *